(No Model.)

M. B. MISHLER.
MACHINE FOR MAKING BALLS.

No. 528,886. Patented Nov. 6, 1894.

Witnesses

Inventor
M. B. Mishler
by Robt. R. Lacey
Attorney

UNITED STATES PATENT OFFICE.

MILTON B. MISHLER, OF RAVENNA, OHIO.

MACHINE FOR MAKING BALLS.

SPECIFICATION forming part of Letters Patent No. 528,886, dated November 6, 1894.

Application filed April 6, 1894. Serial No. 506,628. (No model.)

*To all whom it may concern:*

Be it known that I, MILTON B. MISHLER, a citizen of the United States, residing at Ravenna, Portage county, Ohio, have invented a new and useful Improvement in Machines for Making Balls, of which the following is a specification.

Figure 1:
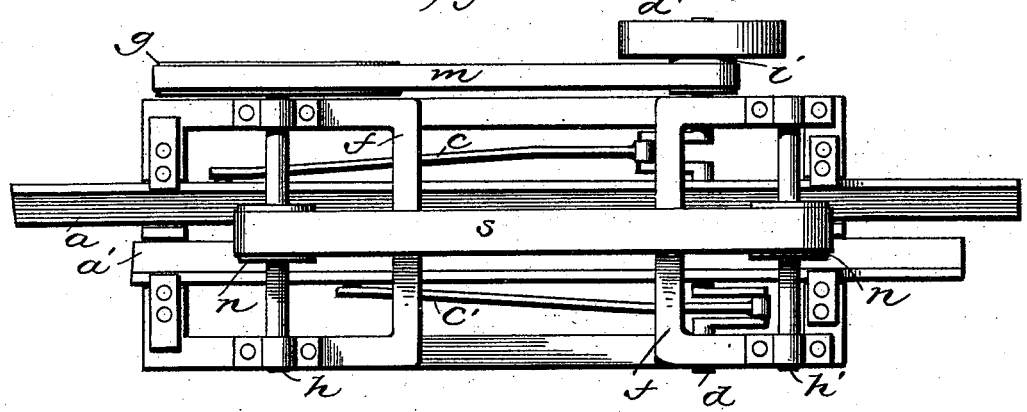
Figure 2:
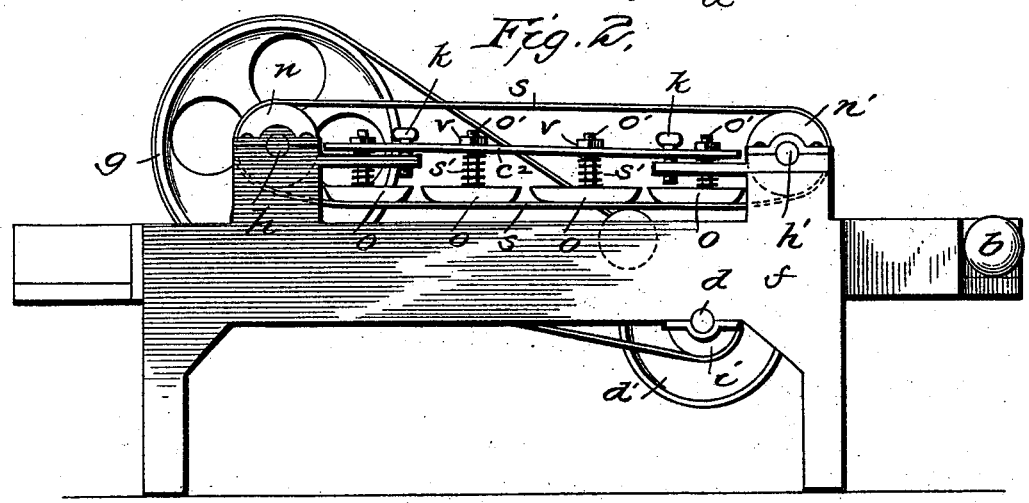
Figure 3:
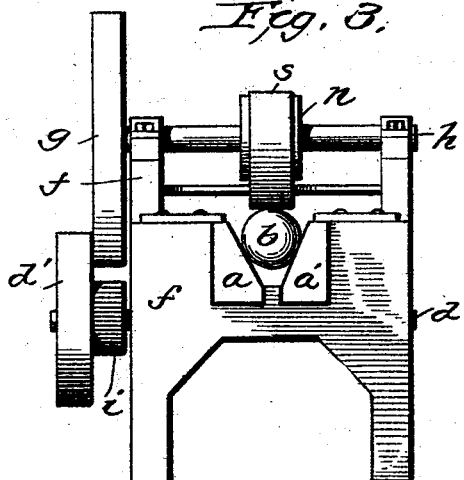

In the drawings forming a part hereof Figure 1 is a plan of said machine. Fig. 2 is a side elevation of the same; and Fig. 3 is an end elevation of the same.

My invention herein set forth relates to the formation of marbles or balls from clay or other plastic material, by rolling the same between and in contact with the converging sides of two formers or bars having opposite reciprocating movements.

The parallel bars $a$ $a'$ formed with their contiguous sides convergent downward, are supported in frame $f$, and each bar is given reciprocating movement in an opposite direction from the other, thereby rolling alternately in opposite directions the balls or marbles $b$ which are supported by the convergent sides of the bars. The reciprocating motion is given to the bars by connecting rods $c'$ $c'$, crank shaft $d$ and driving pulley $d'$. Bars $a$ $a'$ are separated at the bottom a sufficient space to allow any waste or detached particles of clay to fall from between them.

While the balls are in process of formation by being rolled in opposite directions in contact with the convergent sides of bars $a$ $a'$, they are also rolled along the bars by the belt or endless apron $s$, until finished and discharged.

Belt $s$ is operated by pulleys $n$ $n'$, shafts $h$ $h'$, pulleys $g$, $i$, $d'$, and belt $m$. The movement of belt $s$ in contact with the balls should be much slower than that of bars $a$ $a'$, that all parts of the surface of the balls may be brought into contact with bars $a$ $a'$ and belt $s$, and thus rolled a sufficient length of time to form the lumps of plastic material, which are to be fed under pulley $n$ at one end of the machine, into finished balls or marbles when discharged at the other end of the machine. Bar $a$ is of sufficiently greater length than bar $a'$ to always project beyond the latter at the discharging end of the machine for the purpose of uniformly discharging the finished balls in one direction.

A series of pressure plates $o$, provided with screw-threaded pins $o'$, nuts $v$, and springs $s'$, press the lower part of belt $s$ on balls $b$. They are supported by bar $c^2$ which is adjustable for different sized balls by means of thumbscrews $x$. They are also severally adjustable by nuts $v$, as well as self-adjustable or yielding by springs $s'$, to compensate for any slight differences in the quantities of material in balls that are intended to be of uniform size, and also for the irregularity of shape of the partially formed marble or ball in process of formation.

It is preferable, but not essential that one or more plates $o$ be thus used, but they may be dispensed with when the belt $s$ is sufficiently slack and of suitable weight and flexibility, especially if the quantity of material and its consistency in each ball are substantially the same.

If desired, a series of bars $a$ $a'$, and one or more belts $s$ may be arranged side by side in the same machine,—each bar having two sides upwardly convergent.

I claim as my invention—

1. In a machine for making balls, the combination of the parallel straight bars having converging sides and adapted to be reciprocated in opposite directions, and a movable endless belt adapted to travel between and slightly above the said reciprocating bars, substantially as shown and described.

2. In a machine for making balls, the combination of the parallel straight bars having converging sides and adapted to be reciprocated in opposite directions, one of said bars being longer than the other, a movable endless belt adapted to travel between and slightly above said bars, and means for pressing upon the lower flight of said belt, substantially as shown and described.

3. In a machine for making balls, the combination with the parallel bars having converging sides and adapted to be reciprocated in opposite directions and means for operating the same, an endless belt adapted to travel between the bars and slightly above the same, said belt moving slower than the bars, and means for operating said belt from the bar operating means and the adjustable pressing devices adapted to bear upon the lower flight of the belt, substantially as shown and described.

MILTON B. MISHLER.

Witnesses:
 BRADFORD HOWLAND,
 A. F. SHERER.